(12) United States Patent  
Lasagni

(10) Patent No.: US 7,262,867 B2
(45) Date of Patent: Aug. 28, 2007

(54) DEVICE TO DETERMINE THE THICKNESS OF A CONDUCTIVE LAYER

(75) Inventor: Massimo Lasagni, Florence (IT)

(73) Assignee: Galileo Vacuum Systems S.r.l. (IT)

( * ) Notice: Subject to any disclaimer, the term of this patent is extended or adjusted under 35 U.S.C. 154(b) by 311 days.

(21) Appl. No.: 10/513,303

(22) PCT Filed: May 8, 2003

(86) PCT No.: PCT/IT03/00276

§ 371 (c)(1),
(2), (4) Date: Nov. 2, 2004

(87) PCT Pub. No.: WO03/095937

PCT Pub. Date: Nov. 20, 2003

(65) Prior Publication Data

US 2005/0243306 A1    Nov. 3, 2005

(30) Foreign Application Priority Data

May 10, 2002 (IT) ................................ FI02A0077

(51) Int. Cl.
- G01B 7/06 (2006.01)
- G01B 11/28 (2006.01)
- G01B 11/06 (2006.01)
- G01R 33/12 (2006.01)

(52) U.S. Cl. ........................ 356/632; 356/630; 324/230
(58) Field of Classification Search ................ 324/230; 356/630, 632; 451/5
See application file for complete search history.

(56) References Cited

U.S. PATENT DOCUMENTS

| 3,714,430 | A | * | 1/1973 | Finvold et al. .......... 250/338.1 |
| 3,873,209 | A | * | 3/1975 | Schinke et al. ............. 356/135 |
| 4,220,915 | A | | 9/1980 | Kawamoto et al. |
| 4,353,027 | A | * | 10/1982 | Ballato et al. .............. 324/727 |
| 4,631,408 | A | * | 12/1986 | Zelmanovic et al. .. 250/339.11 |
| 4,749,248 | A | * | 6/1988 | Aberson et al. .............. 385/37 |
| 4,849,694 | A | * | 7/1989 | Coates ....................... 324/230 |
| 5,206,588 | A | | 4/1993 | Thorn |
| 5,327,082 | A | * | 7/1994 | Gabura et al. .............. 324/231 |
| 5,355,083 | A | * | 10/1994 | George et al. .............. 324/229 |
| 5,485,082 | A | * | 1/1996 | Wisspeintner et al. ...... 324/202 |
| 6,563,308 | B2 | * | 5/2003 | Nagano et al. ............. 324/230 |
| 6,608,495 | B2 | * | 8/2003 | Sarfaty et al. .............. 324/752 |
| 6,961,133 | B2 | * | 11/2005 | Caton et al. ................ 356/630 |
| 6,966,816 | B2 | * | 11/2005 | Swedek et al. ................ 451/5 |
| 7,050,160 | B1 | * | 5/2006 | Johnson et al. ............... 356/73 |

FOREIGN PATENT DOCUMENTS

| EP | 0 402 527 | 12/1990 |
| EP | 1 116 552 | 7/2001 |
| GB | 1108084 | 4/1968 |
| GB | 1 452 417 | 10/1976 |
| GB | 2 217 835 | 11/1989 |
| IT | 122913 | 4/1989 |
| WO | WO 01/46684 | 6/2001 |

* cited by examiner

Primary Examiner—Gregory J. Toatley, Jr.
(74) Attorney, Agent, or Firm—McGlew and Tuttle P.C.

(57) ABSTRACT

The device comprises at least a measuring head (7) with a transmitter (7A) and a receiver (7B). The head comprises means to measure the thickness through surface resistivity and optical means to measure said thickness by measuring the transparency of the substrate and of the relative layer applied to it.

13 Claims, 4 Drawing Sheets

DEVICE TO DETERMINE THE THICKNESS OF A CONDUCTIVE LAYER

TECHNICAL FIELD

The present invention relates to a device for contact free measurement of the thickness of a layer of material, particularly conductive material, such as a metal or the like, deposited with a vacuum deposition procedure on a substrate or medium, such as a sheet of paper, a plastic film or the like.

STATE OF THE ART

One of the most urgent requirements in the plastic film and paper metallization industry is the need to determine the quality of the treatment in terms of uniformity of the coating, that is the layer deposited. In the case of films which are transparent and have uniform coloring, the most commonly used method to determine this coating is by measuring the transparency. In fact, the thicker the coating, the more opaque the treated material will be. The sizes of interest are therefore "transmittance" and "optical density". The equipment normally used is composed of a system of photometer heads. The photometers can be used in the case of treatment with metallic coatings on transparent and uniformly colored films as they work in the visible or in the infrared.

With regard to metallization on paper or on film that does not have uniform coloring, such as a preprinted film, however, it is not possible to use an optical system to detect the thickness of the coating. In this case the trend of the surface electric resistance may be used as an indicative parameter of the quality of metallization, as the thicker the coating, the lower the surface resistance is. The parameter of reference is also the surface resistivity of the film in some specific applications, such as films for the capacitor industry.

The method for contact free measuring of surface resistivity is to make use of the attenuation which a radiofrequency electromagnetic field, emitted by an emitter, undergoes while passing through the film or other substrate or medium. The lower the surface resistance and, consequently, the thicker the coating, the greater the attenuation is. This attenuation depends on the intensity of the current induced in the metallized layer, said current causing a dispersion in power. The surface resistance may be determined in two different ways:

- by measuring with a receiver, positioned in front of the emitter on the opposite side in relation to the substrate, the field attenuated by the metallized medium. Examples of devices which operate with this method are described in U.S. Pat. No. 4,220,915;
- by measuring the power dispersed due to eddy currents in the metallized layer. Examples of devices based on this technology are described in IT-B-1229313, GB-B-1452417; GB-B-1108084.

OBJECTS AND SUMMARY OF THE INVENTION

The object of the present invention is to produce a measuring device which allows the thickness of the coating to be measured on a plurality of substrates or media.

In substance, according to the invention a device is provided, for contact free measurement of the thickness of a thin layer coated on a substrate, comprising at least a measuring head with a transmitter and a receiver, in which said head comprises means to measure said thickness through the surface resistivity and means to measure said thickness through optical measuring of the transparency of the medium and of the relative layer applied to it.

It is thus possible, with the same head or with a plurality of heads substantially equivalent to and side by side with one another, to perform measurements both by transparency and based on the surface resistivity of the metallized substrate, according to the type of material produced. According to a possible embodiment, the measurements according to the two techniques are alternate, in the sense that a central control unit will, on the basis of programming by the operator, activate either one or the other of said two measurement systems, according to requirements and in particular to the nature of the metallized substrate. However, the possibility of using the two measurement methods simultaneously is not excluded. According to yet another embodiment, the two measurement systems may in any case always be active and the control unit may visualize or in any case alternately use the measurements obtained with one or other of the two techniques.

According to a practical and preferred embodiment of the invention, the transmitter comprises a transmission coil, to produce an electromagnetic field, and an optical emitter positioned coaxially to said transmission coil, and the receiver comprises a receiver coil, to detect the electromagnetic field emitted by the transmission coil and an optical receiver positioned coaxially to the receiver coil, the substrate passing between said transmission coil and said receiver coil.

In this manner a particularly compact device and a head of modest size are obtained, in which the space inside the coils, which constitute the inductances forming the transmitting and receiving antennae to produce and receive the electromagnetic field, is exploited to house optical emission and receiving means.

In a practical embodiment the transmission coil and the receiving coil are each wound on a respective bobbin, made of plastic or in any case non-ferromagnetic material, inside which the optical emitter and the optical receiver are respectively positioned.

Further advantageous features and embodiments of the invention are indicated in the attached dependent claims.

BRIEF DESCRIPTION OF THE DRAWINGS

The invention shall now be better understood according to the description and attached drawing, which shows a non-limiting practical embodiment of the invention. More specifically, the drawing shows.

DETAILED DESCRIPTION OF THE PREFERRED EMBODIMENT OF THE INVENTION

Figure 1:
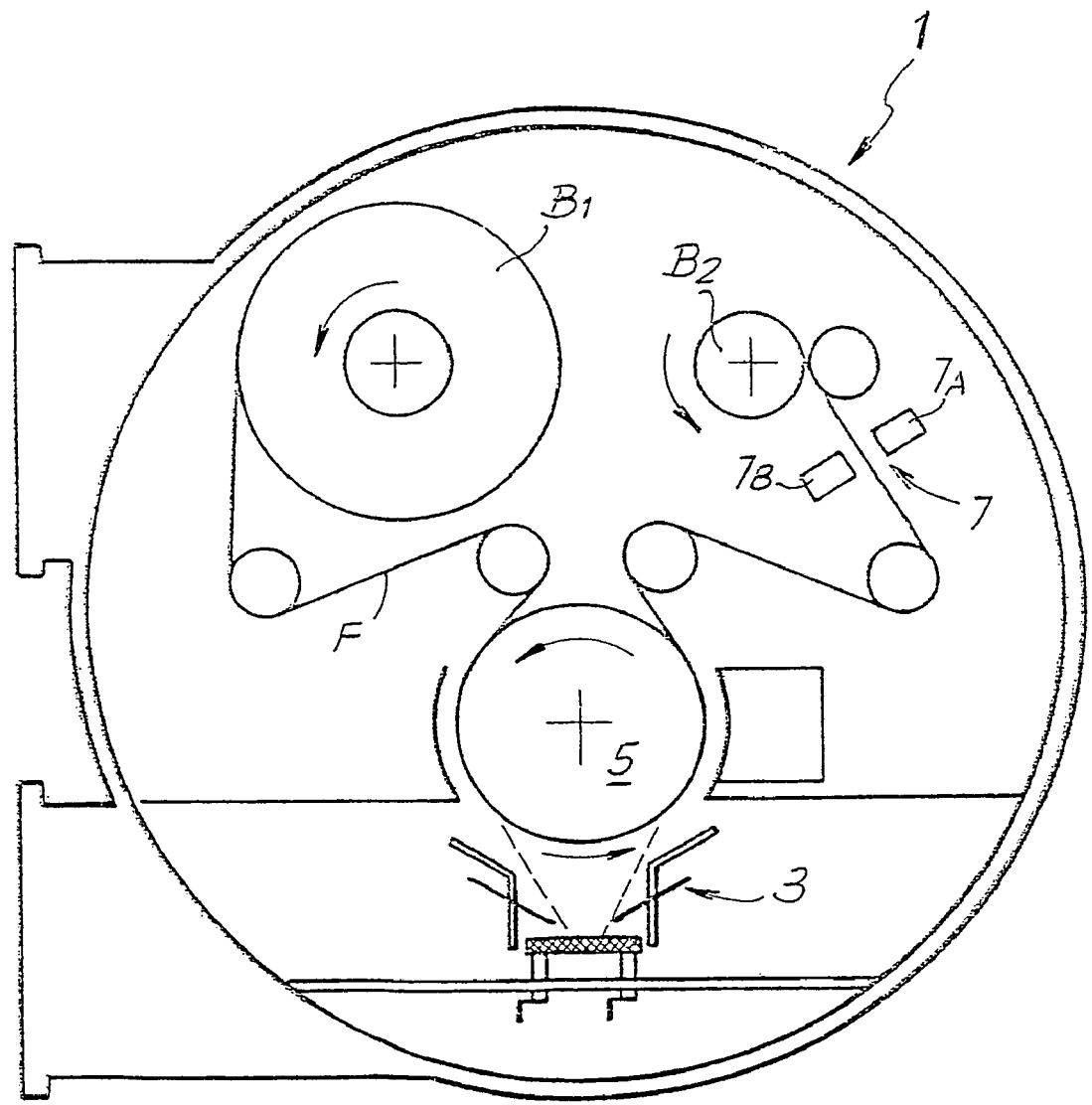
FIG. 1 a diagram of vacuum metallization system, with a measurement device according to the invention.

FIG. 1 generically indicates a system for vacuum metallization of a continuous substrate, for example a plastic film or a paper strip, indicated with F. The numeral 1 generically indicates the vacuum chamber or bell jar, inside which vaporization sources 3 are positioned. The numeral 5 indicates a process roller, on which the film F to be metallized is driven, delivered from a bobbin B1 and which, after having been metallized, is rewound on a bobbin B2.

Positioned along the path of the film F are various driving rollers and the heads to measure the thickness of metallization, indicated as a whole with 7, are arranged in an appropriate position. FIG. 1 shows a single head, it being understood that the others are aligned orthogonally to the plane of the figure, so as to cover the entire transverse extension of the film. The heads may also be arranged staggered in relation to one another in the direction of advance of the film F, to provide a greater number of measuring heads and hence obtain a more accurate measurement.

Figure 2:
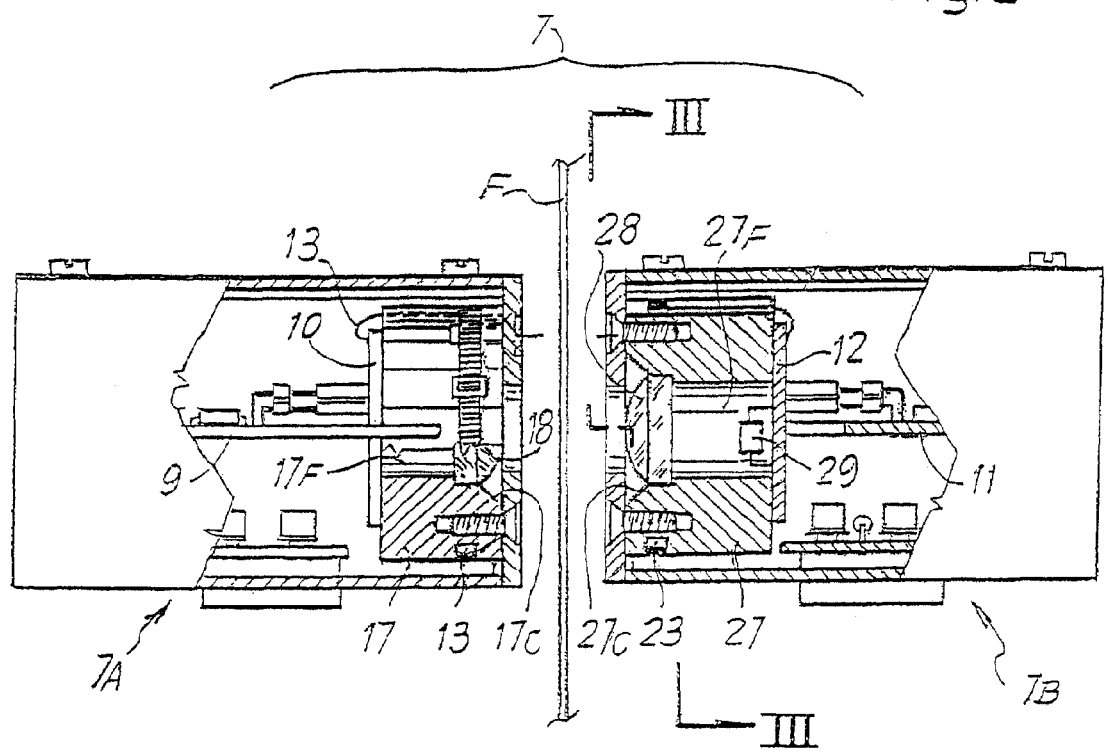
FIG. 2 a side view and partial schematic section of a measuring head.
Figure 3:
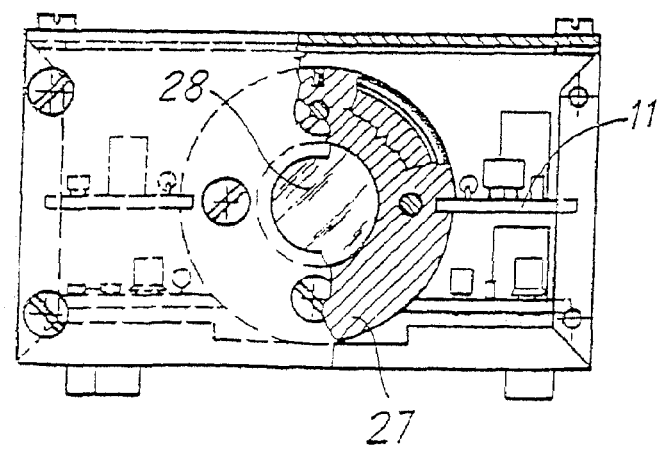
FIG. 3 a partial cross-section and front view according to the line III-III in FIG. 2.

As can be seen in FIG. 2, each head 7 has two parts indicated with 7A and 7B which respectively house the optical and electromagnetic emission elements and the optical and electromagnetic receiving elements. In the diagram in FIG. 2 the numerals 9, 10 and 11, 12 schematically indicate the electronic boards which house the circuit part of the head. Connected to the electronic board 10 is an inductance formed of a coil or solenoid 13 wound in an annular seat of a bobbin 17 mounted on the electronic board 10. The inductance formed by the coil 13 is inserted in an electronic circuit which shall be described below with reference to FIG. 6.

The bobbin 17 has an axial through hole 17F which ends with a conical flared part 17C, facing the part 7B of the head. Housed inside the axial hole 17F is a piano-convex focusing lens 18 and positioned behind this is a light source 19 (not shown in FIG. 2), carried by the board 10 and constituted by a solid state laser with integral photodiode. This is fitted in a circuit which shall be described below with reference to FIG. 4.

Furthermore, the bobbin 17 has two longitudinal grooves diametrically opposite to clamp the electronic board 9 in position.

Electrically connected to the electronic board 11 of the part 7B of the head 7 is an inductance constituted by a second coil or solenoid 23, housed in an annular seat formed in a bobbin 27 fixed to the electronic board 12 and substantially equivalent to the bobbin 17. In the same manner as this, the bobbin 27 is also provided with a through hole 27F ending with a conical flare 27C facing the part 7A of the head. The inductance formed of the coil 23 is fitted in an electronic circuit which shall be described with reference to FIG. 7.

Housed inside the hole 27F is a plano-convex convergent lens 28 positioned in front of a photosensitive element 29, for example a photodiode, fixed on the board 12 and which receives radiation emitted from the source 19 which manages to pass through the film F with the relative metallization coating. The photosensitive element 29 is inserted in a circuit which shall be described in detail with reference to FIG. 5.

Analogously to the bobbin 17, the bobbin 27 also has two diametrically opposite longitudinal grooves in which the board 11 is inserted.

Figure 4:
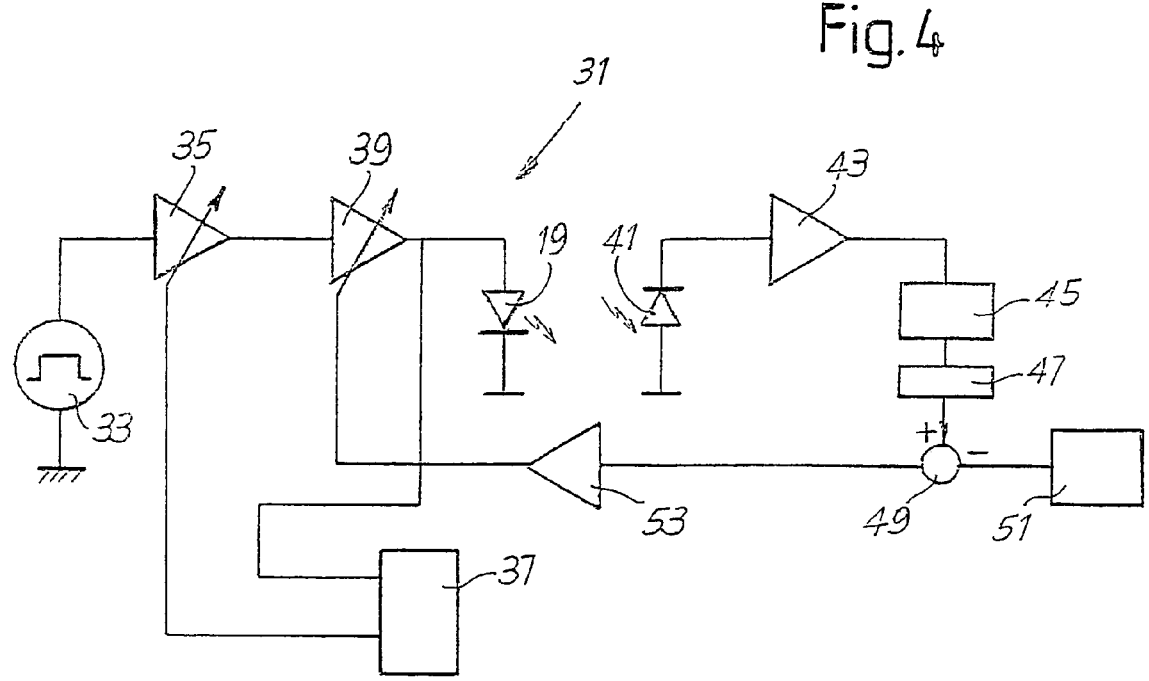
FIG. 4 a circuit diagram of the part of the optical emitter and of the relative electronic components.

With reference to FIG. 4, the solid state laser 19 forming the source is controlled by a circuit, indicated as a whole with 31, which comprises an oscillator 33 and a programmable gain amplifier controlled by a microprocessor 37. The signal of the oscillator 33 is amplified by the amplifier 35 and then transferred to a control buffer with automatic gain control, indicated with 39, of the laser 19. The circuit 31 also comprises a monitor photodiode 41 which continuatively reads the laser 19 emission and the signal of which is amplified by an amplifier 43. The output signal of the amplifier 43 is filtered through a band pass filter 45 with a band centered on the frequency of the emission pulses of the laser 19. This laser, in fact, is controlled in pulsed mode, for example at a frequency around 1 kHz, so as to obtain high peak powers respecting the dissipation limits of the device.

The use of the pulsed laser also makes it possible to reduce the effects of ambient luminosity and any offsets. In fact, if the photodiode 29 is not saturated the light pulses emitted by the laser 19 can be easily discriminated by the background and, moreover, the offsets and dark current of the photodiode 29 (FIG. 5) can be compensated.

The output signal from the band pass filter is sent to a peak detector 47 and the output signal from this is compared in a comparator 49 with a reference signal 51. The output signal from the comparator 49, appropriately amplified by an amplifier 53, is used to regulate the gain of the automatic gain amplifier 39 of the laser 19. The emission power is varied using the amplifier 35 and the change in emission is implemented when the signal received is excessively low or excessively high. In the first case emission is increased and in the second case it is decreased.

Figure 5:
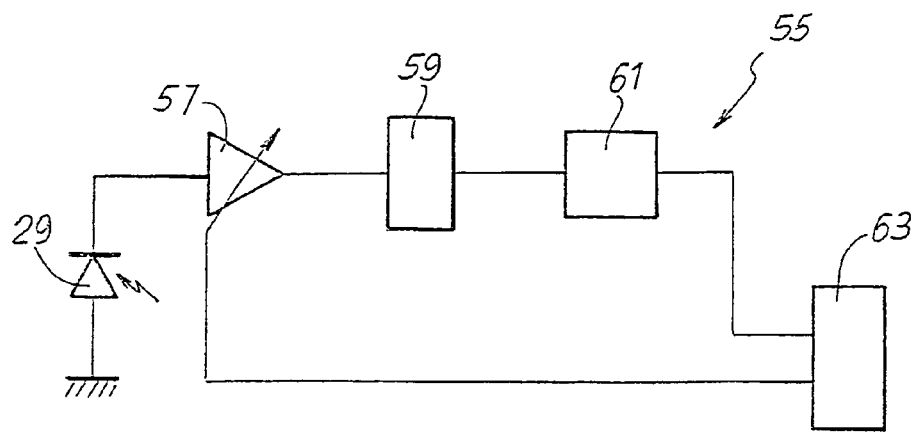
FIG. 5 a circuit diagram of the part of the optical receiver and of the relative electronic components.

The circuit which contains the photodiode or other photosensitive element 29, generically indicated with 55 and represented schematically in FIG. 5, comprises a programmable gain amplifier 57, a band pass filter 59, centered on the frequency of the pulses of the laser 19, a peak detector 61 and a microprocessor 63. The microprocessor 63 may vary the gain of the amplifier 57 if necessary in the event of the signal received being too low or too high.

The microprocessors 37 of the circuit 31 of the various measuring heads arranged in sequence along the transverse direction of the film F are connected to one another by a serial line, as are the processors 63 of the circuit 55. The serial line connects the processors of various measuring heads to a central control unit, not shown. This is used to control the heads and to acquire the results of the reading. In particular, it is used to set the type of reading (optical or by detecting the surface resistance) to be implemented as a function of the type of substrate to which the coating is applied. Alternatively, the heads may constantly operate according to both types of reading and the control unit may be programmed to acquire and process information coming from only one of the operating modes, possibly displaying it or storing it in a suitable manner. Again alternatively, the central unit may be programmed to process both types of measurement simultaneously.

The photodiode 29 receives an optical signal inversely proportional to the thickness of the coating on the film F and this signal is used as a parameter to measure the thickness of the coating. Variations in the signal during transit of the film F in front of the measuring head are an index of an oscillation in the thickness of the coating.

Operation of the optical measuring means described above in the entire interval of optical density required means that the dynamic range of the signal is very wide. For example, an optical density variable from 0 to 4 implies a dynamic range of 1 to 10,000. This is very difficult to produce. The method used to overcome this difficulty consists in dividing the operating range into several intervals with a scale change system. The signal received by the photodiode 29 is compared with two thresholds preset by the microprocessor 63. If the resulting value is above the high level, to avoid saturation of the receiver, amplification of the system must be reduced, while if it is below the lower threshold amplification must be increased to obtain a significant signal. Variation of total amplification is obtained both by acting on the amplifier 57 on the receiving side and on the power emitted, through the amplifier 35. Indeed, if the signal received is very low, comparable with the background noise, amplification of the signal received through the amplifier 57 on its own has no advantages. In this case it is necessary to increase the signal-to-noise ratio. This is obtained by increasing the signal inciding on the photodiode 29, that is by increasing the power emitted.

Figure 6:
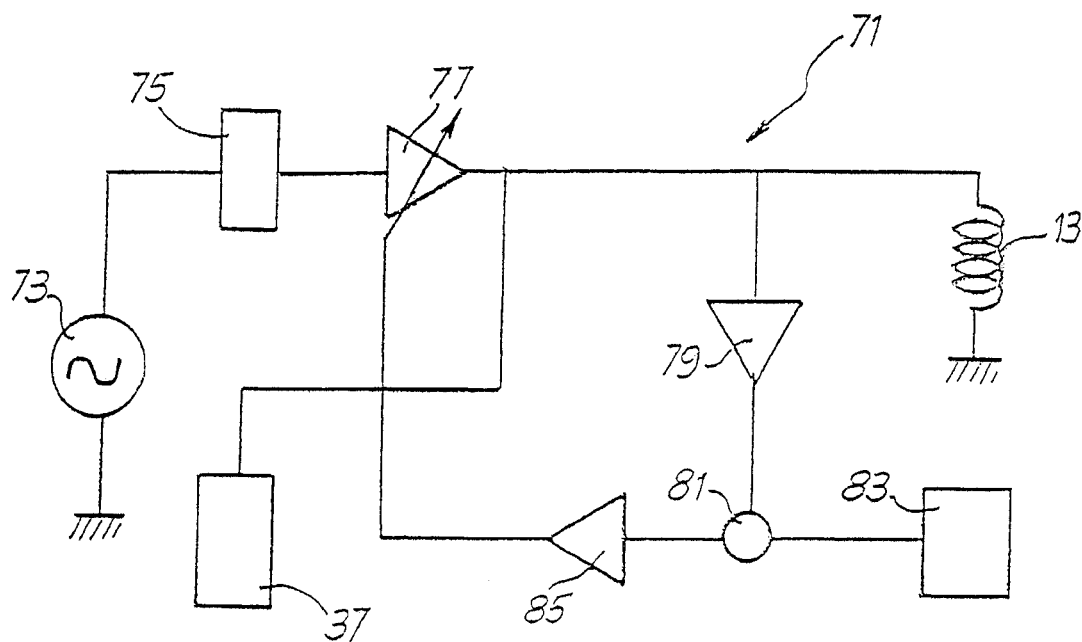
FIG. 6 a circuit diagram of the part which produces the electromagnetic field to measure surface resistivity.

The control circuit of the electromagnetic field emission inductance 13 is schematically represented in FIG. 6 and indicated as a whole with 71. It comprises a radiofrequency generator 73, a band pass filter with high selectivity 75, ceramic or SAW, which receives the input signal produced by the generator 73 and the output of which is amplified by an automatic gain amplifier 77. The energizing output signal from the latter is applied to the coil or inductance 13. An emission control circuit is also provided to maintain electromagnetic emission of the inductance 13 constant.

The control circuit comprises a measuring circuit 79 of energization of the transmitter which produces a voltage signal proportional to the signal emitted by the inductance 13. This is compared in a comparator 81 with a signal of reference 83. The output of the comparator 81, suitably amplified by an amplifier 85, controls the gain of the amplifier 77.

Moreover, the energizing signal is also processed by the microprocessor 37, described with reference to FIG. 4.

Figure 7:
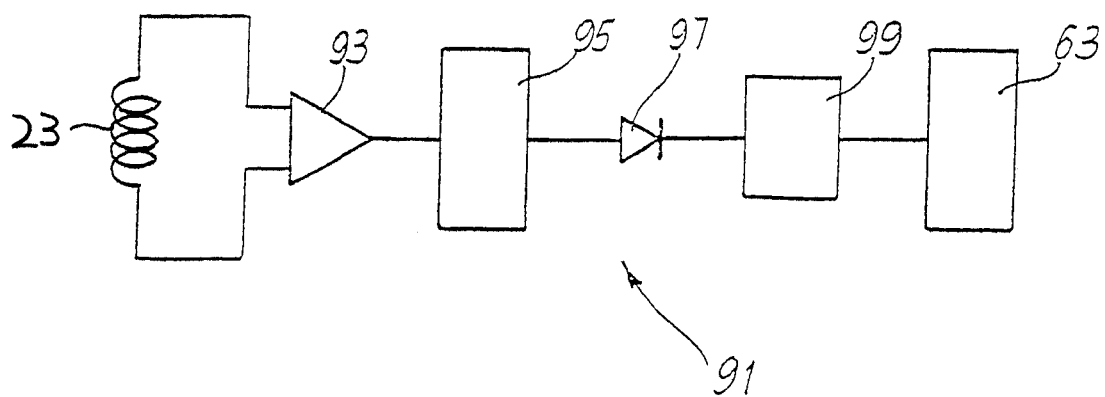
FIG. 7 a circuit diagram of the part receiving the electromagnetic field.

Positioned on the part 7B of the head 7 is a receiving circuit generically indicated with 91, represented schematically in FIG. 7, to receive the electromagnetic signal which, emitted by the inductance 13, passes through the metallized film or substrate F and reaches the inductance 23. The circuit 91 comprises a differential amplifier 93, which receives the incoming signal picked up by the inductance 23 and the output of which is connected to a band pass filter 95 with high selectivity, ceramic or SAW, the pass band of which, just as that of the band pass filter 75 of the circuit 71, is centered on the emission frequency of the radiofrequency generator 73. The pass signal passes through a diode 97 and a mean square value detector, indicated with 99. The signal thus obtained is sent to the microprocessor 63, already described with reference to FIG. 5.

It is understood that the drawing merely shows a practical example of the invention, which may vary in form and layout without however departing from the scope of the underlying concept of the invention.

The invention claimed is:

1. A device for contact free measurement of the thickness of a thin layer coated on a substrate, the device comprising:
   a measuring head including optical means for measuring the thickness of the thin layer coated on the substrate, said optical means measuring the transparency of the substrate and of the relative layer applied to the substrate, said optical means including an optical transmitter and an optical receiver, said optical transmitter and said optical receiver being arranged on opposite sides of said substrate, said optical transmitter and said optical receiver measuring attenuation of an optical signal passing through the substrate, said head comprising surface resistivity means for measuring the thickness of the thin layer coated on the substrate through surface resistivity, said surface resistivity means comprising a transmitter with a transmission coil and a receiver with a receiver coil, said transmitter producing an electromagnetic field, said receiver detecting the electromagnetic field emitted by said transmission coil, said receiver and said transmitter measuring attenuation of said electromagnetic field when electromagnetic field passes through the substrate, said transmitter coil and said receiver coil being arranged on opposite sides of said substrate, the substrate passing between said transmission coil and said receiving coil, said optical transmitter being arranged coaxially with said transmission coil, said optical receiver being coaxially arranged with said receiving coil.

2. A device in accordance with claim 1, wherein said transmission coil is wound on a bobbin, inside which said optical emitter is positioned.

3. A device in accordance with claim 1, wherein said receiver coil is wound on a bobbin, inside which said optical receiver is positioned.

4. A device in accordance with claim 2, wherein said optical emitter comprises a light source and a collimation lens.

5. A device in accordance with claim 3, wherein said optical receiver comprises a focusing lens and an optical sensor.

6. A device in accordance with claim 1, further comprising a plurality of said heads positioned side by side.

7. A device in accordance with claim 1, further comprising a main control unit, with which said at least one measuring head is interfaced.

8. A device in accordance with claim 7, wherein a plurality of measuring heads are provided, said heads being connected to said main control unit through a serial line.

9. A device in accordance with claim 7, wherein both means to measure the thickness through surface resistivity and optical means to measure the thickness by measuring the transparency of the substrate are simultaneously active in each measuring head, and wherein said control unit only processes the data coining from one or other of said measuring means.

10. A device in accordance with claim 7, wherein both means to measure the thickness through surface resistivity and optical means to measure the thickness by measuring the transparency are simultaneously active in each measuring head, and wherein said control unit processes the data coining from one or other of said measuring means for the same substrate.

11. A device in accordance with claim 7, wherein said main control unit alternately activates the measuring means through surface resistivity or the optical means in each measuring head.

12. A device for contact free measurement of the thickness of a layer coated on a substrate, the device comprising:
   a measuring head having a first part and a second part, said first part being disposed opposite said second part such that said first part and said second part define a space, the substrate being located within said space;
   an optical means having an optical transmitter arranged in said first part and an optical receiver located in said second part, said optical transmitter emitting light directed at the substrate, said substrate being exposed to said light, said optical receiver detecting attenuation of light after the substrate is exposed to said light, said optical means measuring the transparency of the substrate and the thickness of the layer applied to the substrate via said attenuation of light;

a surface resistivity means having a transmitter located within said first part and a receiver arranged in said second part, said transmitter having a transmission coil, said transmitter producing an electromagnetic field, the substrate being exposed to said electromagnetic field, said transmission coil being arranged coaxially with said optical transmitter, said receiver having a receiver coil, said receiver detecting attenuation of said electromagnetic field, said receiving coil being coaxially arranged with said optical receiver, said surface resistivity means determining surface resistivity of the substrate from said attenuation of said electromagnetic field, said surface resistivity means determining the thickness of the layer coated on the substrate via said surface resistivity.

13. A device in accordance with claim 1, wherein:

said transmission coil is wound on a first support, said first support having a first support central seat, said optical emitter being positioned inside said first support central seat;

said receiver coil is wound on a support, said support having a support central seat, said optical receiver being positioned inside said support central seat;

a collimator lens is arranged in front of said optical transmitter, said collimator lens frontally closing said first support central seat; and a focusing lens is arranged in front of said optical receiver, said focusing lens frontally closing said support central seat.

* * * * *